US007959500B1

(12) United States Patent
Baker et al.

(10) Patent No.: US 7,959,500 B1
(45) Date of Patent: Jun. 14, 2011

(54) PROCESS FOR PREPARING RIB MEAT PRODUCT

(76) Inventors: James A. Baker, Avon, OH (US); Brittani Baker, Westlake, OH (US)

( * ) Notice: Subject to any disclaimer, the term of this patent is extended or adjusted under 35 U.S.C. 154(b) by 0 days.

(21) Appl. No.: 12/691,450

(22) Filed: Jan. 21, 2010

Related U.S. Application Data

(62) Division of application No. 11/595,268, filed on Nov. 9, 2006, now Pat. No. 7,666,075.

(51) Int. Cl.
*A22C 17/00* (2006.01)

(52) U.S. Cl. ....................................................... 452/135

(58) Field of Classification Search ................ 452/2–6, 452/102–105, 125, 137, 198
See application file for complete search history.

(56) References Cited

U.S. PATENT DOCUMENTS

| 4,137,605 | A | 2/1979 | van Rij et al. |
| 4,186,216 | A | 1/1980 | Roth |
| 4,217,679 | A | 8/1980 | Gordon |
| 5,104,351 | A | 4/1992 | van den Nieuwelaar et al. |
| 5,197,918 | A | 3/1993 | Klaassen |
| 5,273,483 | A | 12/1993 | Gagliardi, Jr. |
| 5,464,368 | A | 11/1995 | White et al. |
| 5,525,103 | A | 6/1996 | White et al. |
| 5,667,435 | A | 9/1997 | Baughman et al. |
| 5,775,986 | A | 7/1998 | Law et al. |
| 5,823,867 | A | 10/1998 | Roth et al. |
| 5,868,613 | A | 2/1999 | Heidke et al. |
| 5,976,004 | A | 11/1999 | Hazenbroek |
| 6,527,636 | B2 | 3/2003 | Mickelsen |
| 6,648,744 | B2 | 11/2003 | Bell et al. |
| 6,716,097 | B2 | 4/2004 | Freund et al. |
| 7,008,313 | B2 | 3/2006 | Gagliardi, Jr. |
| 7,022,007 | B2 | 4/2006 | Naehring |
| 7,198,564 | B2 | 4/2007 | Hino et al. |
| 2006/0035005 | A1 | 2/2006 | McMindes et al. |

FOREIGN PATENT DOCUMENTS

EP     1053684     11/2002

*Primary Examiner* — Thomas Price
(74) *Attorney, Agent, or Firm* — Curatolo Sidoti Co., LPA; Salvatore A. Sidoti

(57) ABSTRACT

A cooked and de-boned substantially intact slab of rib meat is provided. A process for preparing a de-boned rib meat product from a pork or beef rib cut is also provided. The process for preparing the rib meat product involves cooking a length of rib meat having rib bones embedded therein at a temperature and for a time sufficient to enable the removal of the rib bones from the length of rib meat, while maintaining a substantially intact length of rib meat.

23 Claims, 5 Drawing Sheets

PROCESS FOR PREPARING RIB MEAT PRODUCT

CROSS REFERENCE TO RELATED APPLICATIONS

This application is a divisional application of copending application U.S. Ser. No. 11/595,268 filed on Nov. 9, 2006, which is incorporated by reference in its entirety.

TECHNICAL FIELD

Generally provided is a cooked and de-boned meat product and a process for preparing the meat product. More particularly, provided is a cooked and de-boned rib meat product and a process for preparing the rib meat product. The process of preparation results in a ready-to-eat substantially intact beef or pork rib meat steak, which does not include any rib bones.

BACKGROUND

Pork and beef carcasses are typically butchered into several cuts or portions, which may be used to prepare spare ribs and back ribs. Spare ribs may be further divided into the traditional breast bone spare ribs or St. Louis style spare ribs. St. Louis style spare ribs generally comprise the upper part of a rib separated from the breast bone or brisket bone. St. Louis style spare ribs are generally very meaty and include minimal fat.

Back rib cuts are generally prepared by cutting the loin sections between the back ribs and the semispinalis muscle adjacent to the hack ribs to form a loin cut and a back rib cut. The back rib meat cut, also known as a baby back rib cut, includes rib bones and related intercostal meat. Each back rib cut is intact and includes portions of at least eight ribs. See *Institutional Meat Purchaser Specification Item No. 422* (June, 1997). Back rib cuts are generally sold as a single intact rib section, which may be prepared and consumed with various sauces. The demand for the baby back rib cuts has increased dramatically in recent years due to the increase in the number of barbeque-themed restaurants. However, because back rib cuts typically contain only intercostal meat between the rib bones, conventional back rib cuts do not include a substantial amount of meat.

In recent years, corporations owning barbeque-themed restaurants have become increasingly interested in barbeque style food products that can retain the interest of repeat business. Consuming barbeque style ribs in a social situation, however, has always been a delicate undertaking. Traditionally, barbeque style ribs have carried the distinction of being an untidy food item, and as a result, are left off of may fine dining menus. Enjoying barbeque style ribs is often difficult, as eating them can be time consuming, embarrassing, and messy. As is often the custom, barbeque ribs are eaten without utensils, utilizing one's own hands to assist in separating the meat from the rib bones and introducing the meat into one's mouth.

As a result of this direct contact of the meat with the hands, the thick consistency of barbeque sauce has the potential to coat one's hands and is difficult to remove without the assistance of a moist towelettes or inserting by one's own fingers into their mouth to assist in removing the excess barbeque sauce.

Embarrassment can also occur due to the shape of the rib bones themselves. A single barbeque style rib possesses the shape of an elongated cylinder, encased in meat and covered with barbeque sauce. When taken to one's mouth to eat, if not eaten with care, the rib can displace sauce onto the consumer's face, which can cause great embarrassment.

There are also health risks associated with the consumption of ribs. Because of the irregular shapes and hardness of the rib bones, the risk of injury to the inside of one's mouth is also a concern. Furthermore, the potential for choking on a portion of a rib hone causes people to avoid consuming ribs.

Additionally, a meat cut that includes both rib bones and associated meat makes it more difficult for a person to consume all available meat, because the person must work around and between the bones. Therefore, consuming barbeque style ribs has the tendency to be tedious and laborious, due to the requirement of tearing the meat from the bones and eating meat from around the rib bones themselves.

There have been attempts to produce boneless pork and beef back rib products. One such method of producing boneless rib meat includes first separating the rib meat from the bones, creating a paste-like meat intermediate product, and restructuring the paste-like intermediate product into a form that attempts to resemble the appearance of a natural slab of ribs. These types of processed or restructured rib products are commonly offered by fast food restaurant chains and in the frozen foods sections of retail grocery stores. Obviously, these boneless pork or beef products that lack the natural appearance and consistency of an unprocessed slab of rib meat.

Heretofore, there has been no process for providing a ready-to-eat de-boned rib product that does not involve processing the native rib meat into piece or parts, and reforming or restructuring meat pieces into a slab-shaped product. Accordingly, there is still a need in the art for a barbeque style rib meat product that can be readily consumed and that overcomes the disadvantages associated with consuming traditional barbeque ribs having bones embedded therein. Such a de-boned rib meat product would avoid the stigma traditionally attached to dining on barbeque style ribs and is therefore more likely to result in repeat business for barbeque-themed restaurants, retail grocery outlets, and the like.

SUMMARY

Provided is a de-boned substantially intact length of rib meat.

Also provided is a cooked and de-boned substantially intact length of rib meat.

Additionally provided is a process for preparing a length of de-boned rib meat comprising cooking a length of rib meat having at least one rib bone at least partially embedded therein at a temperature and for a time sufficient to enable the removal of at least one of said rib bones from said length of rib meat, while maintaining a substantially intact length of rib meat; and removing at least one of said rib bones from said length of rib meat.

Further provided is a packaged ready-to-heat and serve rib meat product comprising a package, at least one de-boned substantially intact length of rib meat contained within said package, and optionally a flavoring agent associated with said package.

DETAILED DESCRIPTION

Figure 1:
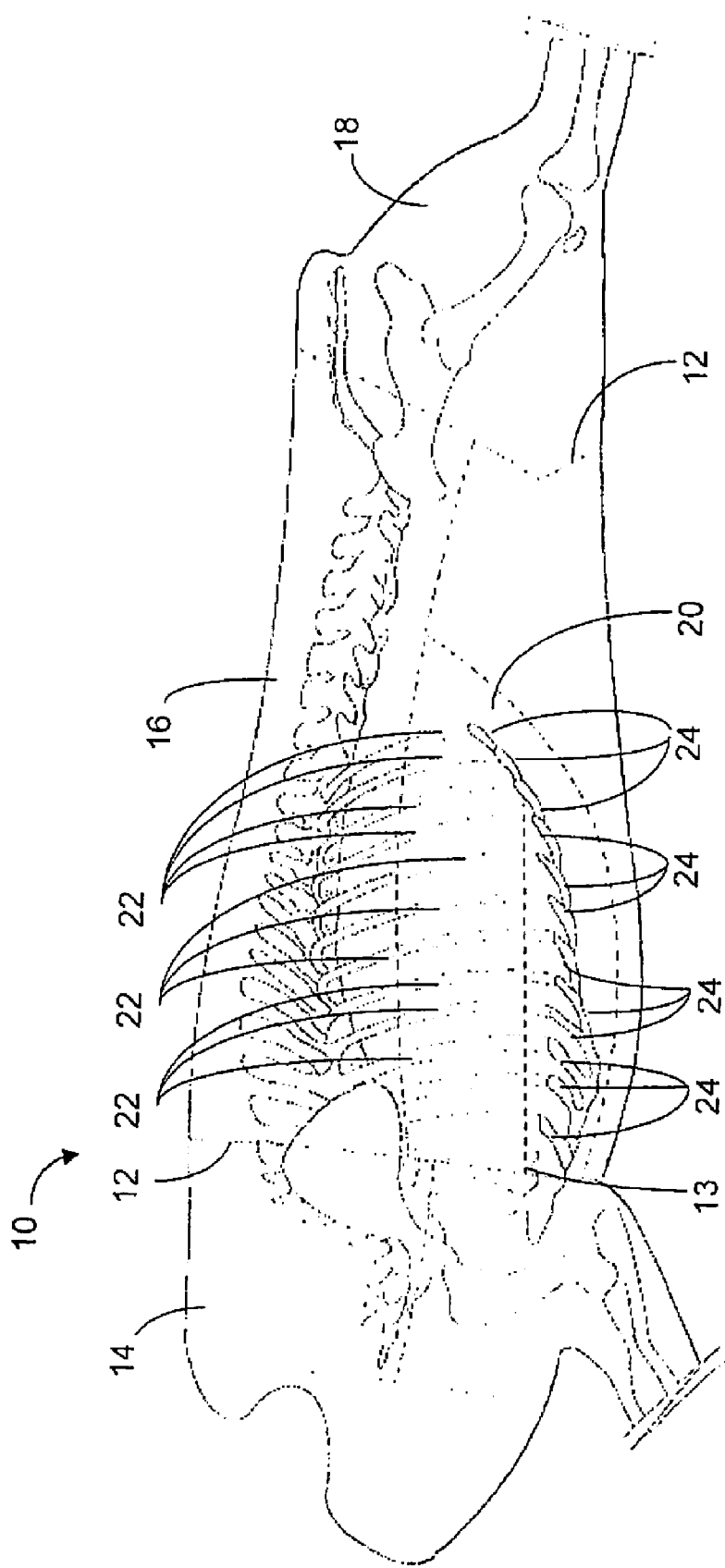
FIG. 1 is a side sectional view of a side of pork or beef with cut lines added to illustrate main portions including St. Louis style rib and back rib portions.

Disclosed is a process for the preparation of a de-boned beef or pork rib meat cut. Broadly, the rib meat cut is prepared by cooking a desired length of rib meat having at least one bone embedded within the rib meat and removing the at least one of the embedded rib bones from the rib meat. According to the process, the rib bones can be easily separated from the rib meat, while the maintaining a substantially intact length of rib meat. Thus, the process provides a cooked and de-boned substantially intact continuous length of rib meat. The rib meat product can be consumed using conventional utensils (fork and knife), without having to first separate the meat from the bones, or to navigate around the bones to remove all of the rib meat. By removing the bones from a barbeque style slab of rib meat, the tediousness, embarrassing, and messy nature of the act of consuming the ribs is avoided.

According to illustrative embodiments, the process for preparing the rib meat product involves cooking a length of rib meat having at least one rib bone embedded therein at a temperature and for a time sufficient to enable the removal of at least one the rib bones from the length of rib meat, while maintaining the continuous length of natural rib meat. At least one of the embedded rib bones is removed from the rib meat, thereby forming a substantially intact continuous length of rib meat.

As used throughout this specification, the term "cooking" shall refer to partially cooking, substantially cooking, or fully cooking a desired length of rib meat. A partially cooked length of rib meat retains certain qualities of raw pork or beef meat, but a higher internal temperature than that of raw meat is reached within the meat. A substantially cooked length of rib meat refers to meat that has been more than partially cooked and has reached an internal temperature where the rib meat begins to lose its reddish color. A fully cooked length of rib meat refers to a length of rib meat that has been cooked such that it can be readily consumed without a health risk. The term "cooked" refers to a length of rib meat that has been partially cooked, substantially cooked or fully cooked. It should be noted that partially cooking, substantially cooking, or fully cooking may provide sufficient cooking to produce rib meat retaining minimal attachment to the rib hones, thereby enabling the removal of the rib bones from the meat while maintaining a substantially intact continuous length of rib meat.

As used throughout this specification, the term "dc-honed" shall refer to a desired length or section of rib meat, wherein at least one of the rib bones embedded in the rib meat has been removed. Thus, a de-boned length of rib meat refers to desired lengths of rib meat wherein one or more of the rib bones have been removed from the meat. According to certain illustrative embodiments, all of the rib bones in a desired length of rib meat have been removed to provide a boneless length of rib meat. It should be noted, however, that it may be desirable to leave one or more of the rib bones embedded within the length of rib meat at strategic positions. Therefore, the term "de-boned" may also refer to those lengths of rib meat in which at least one rib bone has been removed, but at least one rib bone remains embedded in the rib meat.

As used throughout this specification, the term "substantially intact" refers to a desired length or section of rib meat, wherein after removal of at least one of the rib bones embedded therein, the rib meat substantially retains its natural consistency, texture, and shape it held prior to the bones being removed. It should be noted that in removing the bones from the length or section of rib meat, the bones may retain some slight level of attachment to the meat wherein the bones emerge from the length of rib meat with an amount of meat remaining attached on the bones. This situation is encompassed by the term "substantially intact."

The term "length of rib meat" refers to any desired section or portion of rib meat. It can be appreciated that a length of rib meat is not limited to a length of rib meat that spans a plurality of rib bones, but the length of rib meat may also comprise an individual (a single rib section) rib section wherein the one rib bone location in this rib meat section has been removed. A single rib meat section simply comprises the rib meat adjacent both sides of the removed rib bone and connecting meat.

FIG. 1 is a diagrammatical side sectional view of the side of pork or beef 10 with cut lines 12 added to illustrate the major cuts or portions of side 10 after butchering. Typically, side 10 is butchered about cut lines 12 into main cuts or portions including shoulder 14, loin 16, ham 18, and belly 20. Back ribs 22, also known as "baby back" ribs, originate from the blade and center section of the loin 16. Back ribs 18 contain meat between the ribs called finger meat and include at least 8 ribs.

Spare ribs 24 comprise the intact rib section removed from the belly 20 of the pork side. Spare ribs 24 may be further butchered or cut into St. Louis-style spare ribs and brisket or breast bone spare ribs. Spare ribs 24 are separated into St. Louis-style ribs and breast hone spare ribs by cutting about cut line 13 along costal cartilage connecting the breast hone spare ribs and the St. Louis-style ribs. Breast bone spare ribs are generally taken from the belly of the hog or cow.

Figure 2:
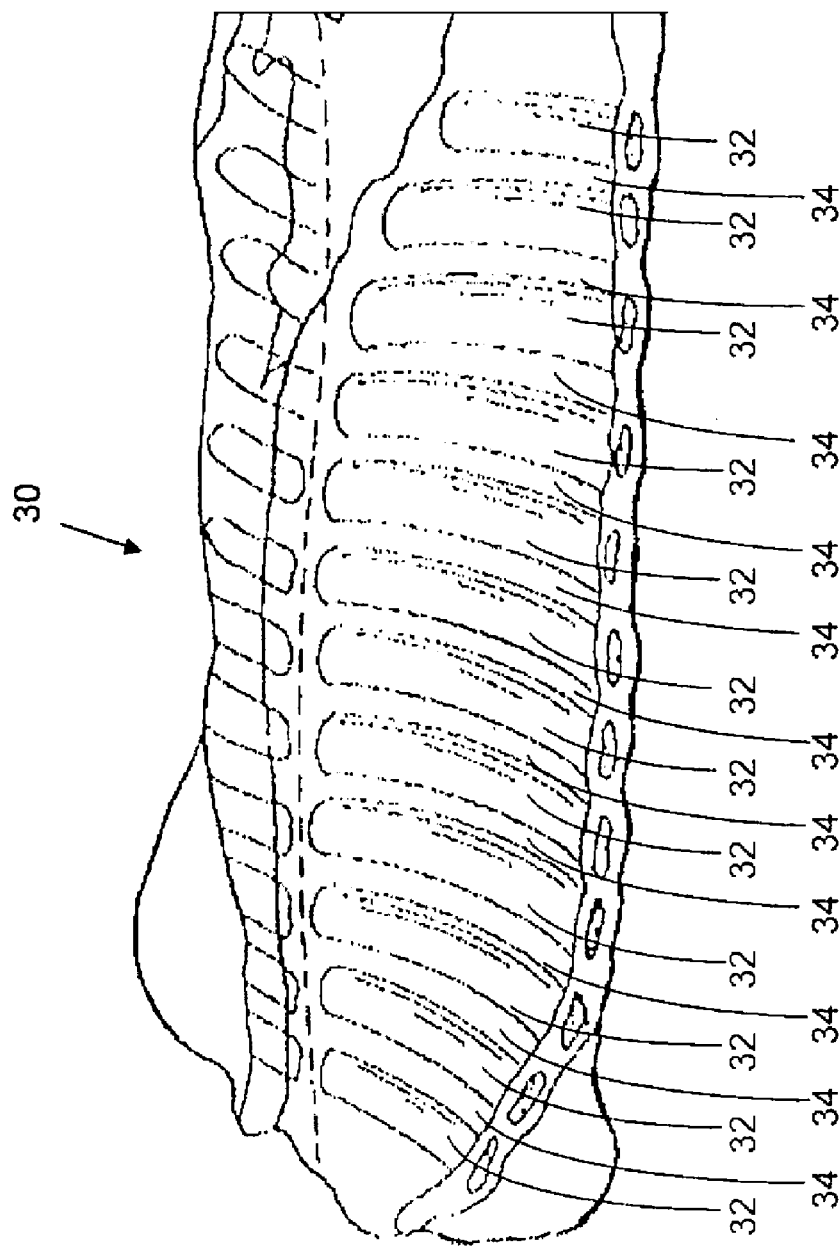
FIG. 2 is a perspective view of slab of rib meat including a plurality of rib bones embedded within the rib meat.

FIG. 2 illustrates the traditional slab of rib meat 30 with rib bones 32 lodged among the intercostal meat 34. Despite St Louis-style ribs being illustrated in FIG. 2, this process is not limited to the preparation of a de-boned and substantially intact length of rib meat from a St. Louis-style rib cut, but may also include any rib cut including, without limitation, the traditional spare rib cut and baby back rib cut.

Figure 3:
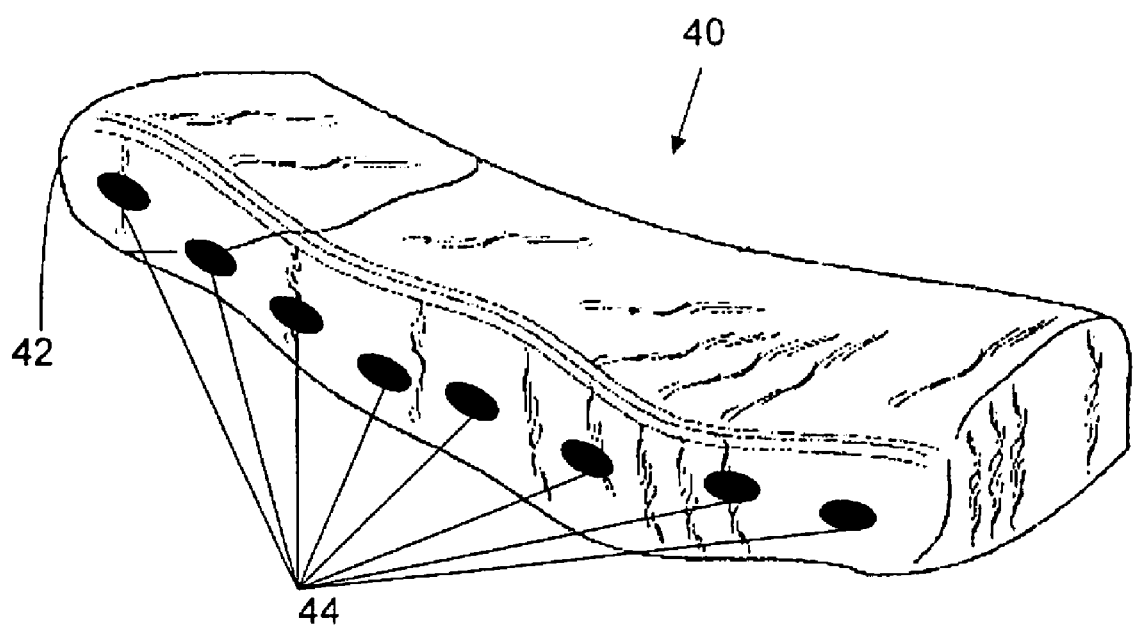
FIG. 3 is a perspective view of a cooked and de-boned continuous slab of rib meat.

FIG. 3 is a perspective view of an illustrative embodiment of a cooked and substantially intact length of rib meat prepared in accordance with the process. As shown in FIG. 3, side 42 of the rib meat product 40 comprises a completely de-boned and substantially intact length of rib meat that is ready for consumption. Reference numeral 44 refers to the channel or slits in the rib meat where the rib bones had resided prior to being removed. The rib meat 40 retains its natural consistency, texture, form and shape it held prior to the bones being removed. The cooked and de-boned length of rib meat resembles a high-end boneless steak or filet of rib meat. Accordingly, the rib meat is more palatable and can be consumed in an easier and tidier fashion, which is contrary to most previous barbeque dining experiences.

The process for preparing a length of de-boned rib meat includes cooking a length of rib meat having at least one rib bone embedded therein at both a temperature and for a time sufficient to enable the removal of at least one of said rib bones from the length of rib meat, without causing significant damage to the meat and maintaining a substantially intact length of rib meat. At least one of the rib hones is removed from the length of rib meat. According to certain embodiments, all of the bones from the length of rib meat are removed to produce a boneless slab of rib meat.

The rib meat is cooked under certain time-temperature regimens to enable the removal of the rib bones from the rib meat without damaging the continuous length of rib meat. According, to certain illustrative embodiments, the rib meat is cooked pursuant to at least two time-temperature regimens. By way of illustration, but not in limitation, the process includes cooking the length of rib meat at a first temperature for a first period of time, followed by cooking the length of rib meat at a second temperature for a second period of time. Cooking the rib meat in accordance with these time-temperature regimens permits the easy removal of at least one of the rib bones from the length of rib meat.

According to certain embodiments, desired lengths of rib meat are cooked at a temperature of greater than 0 to about 400 degrees Fahrenheit for a sufficient amount of time to enable the removal of at least one of said rib bones from the length of rib meat, without causing significant damage to the meat and maintaining a substantially intact length of rib meat.

According to certain embodiments, desired lengths of rib meat are cooked at a temperature of greater than 0 to about 400 degrees Fahrenheit for a period of time ranging from about 1 hour to about 6 hours to enable the removal of at least one of said rib bones from the length of rib meat, without causing significant damage to the meat and maintaining a substantially intact length of rib meat.

According to certain embodiments, desired lengths of rib meat are cooked at a temperature of greater than 0 to about 400 Fahrenheit for a period of time ranging from about 1 hour to about 5 hours to enable the removal of at least one of said rib bones from the length of rib meat, without causing significant damage to the meat and maintaining a substantially intact length of rib meat.

According to certain embodiments, the time-temperature regimens for cooking the rib meat include cooking a length of rib meat for a first temperature from about 100 to about 300 degrees Fahrenheit for a period of time from about 1 to about 6 hours, followed by cooking the length of rib meat at a second temperature for a second period of time and removing at least one of the rib bones from the length of cooked rib meat.

According to other embodiments, the time-temperature regimens for cooking the rib meat includes cooking said length of rib meat at a first temperature for a first period of time, followed by cooking the length of rib meat at a second temperature from about 200 to about 400 degrees Fahrenheit for a time period from about 30 about 120 minutes, and removing at least one of the rib bones from the length of rib meat.

According to further embodiments, the time-temperature regimens for cooking the rib meat cooking said length of rib meat at a first temperature from about 100 to about 300 degrees Fahrenheit for a time period from about 1 to about 6 hours, followed by cooking said length of rib meat for a second temperature from about 200 to about 400 degrees Fahrenheit for a time period from about 30 to about 120 minutes and removing at least one of the rib bones from the length of rib meat.

According to further embodiments, the time-temperature regimens for cooking the rib meat comprises cooking the length of rib meat at a first temperature of about 400 degrees Fahrenheit for a time period from about 1 to about 4 hours, followed by cooking the length of rib meat for a second temperature of about 300 degrees Fahrenheit for a time period from about 30 to about 90 minutes and removing at least one of the rib hones from the length of rib meat.

To facilitate the retention of moisture within the length of rib meat during the one or more of the various cooking regimens, the length of rib meat may be located within a moisture loss preventive environment. The moisture loss preventive environment is any suitable environment that acts to minimize, reduce, lessen or prevent loss of moisture of from the length of rib meat. For example, without limitation, to facilitate the retention of moisture in the rib meat, at least a portion of the length of rib meat may be enclosed or wrapped in a suitable moisture loss preventive material. Such materials include plastic wrap, metal foil, such as aluminum foils, cooking bags, and other suitable containers. The step of enclosing or wrapping the length of rib meat in a moisture loss preventive material may also comprise hermetically sealing the length of rib meat in a suitable hermetic enclosure. The length of rib meat may be enclosed or wrapped in such moisture loss preventive material at any stage prior or during the cooking process. To be hermetically sealed, the slab of rib meat will cook within its own environment that is different from the oven enclosure. Sealing the slab of rib meat protects the slab from a cooking environment and maintains the moisture level within the slab of rib meat. A plastic sheet or plastic bag or any other suitable packaging (such as vacuum packaging) may be used to wrap the slab of rib meat as long as it provides a hermetic enclosure. It should be noted that the step of locating the length of rib meat within a moisture loss preventive environment is not limited to enclosing or wrapping the meat within a moisture loss preventive material. The length of rib meat may be positioned within the inner chamber or volume of suitable piece of equipment and further cooked, so long as the chamber or volume acts to minimize, reduce or even prevent moisture loss from the length of rib meat.

By way of illustration, the desired length of rib meat may be to enclosed within a moisture loss preventive environment to facilitate retention of moisture within the length of rib meat, prior to the commencement of any cooking. Thus, according to certain embodiments, the process for preparing a de-boned length of rib meat includes enclosing the length of rib meat in the moisture loss preventive environment and then cooking the length of rib meat at a temperature and for a time sufficient to enable the removal of at least one of said rib bones from the length of rib meat, while maintaining a substantially intact continuous length of rib meat. Upon completion of the cooking stage of the process, at least one of the rib bones is separated from the length of rib meat.

According to certain embodiments, the process for preparing a de-boned length of rib meat includes locating the length of rib meat in the moisture loss preventive environment and then cooking the length of rib meat cooking at a first temperature for a first period of time and cooking the length of rib meat at a second temperature for a second period of time enable the removal of at least one of the rib bones from the length of rib meat, while maintaining a substantially intact continuous length of rib meat. Upon completion of the cooking stage of the process, at least one of the rib bones is separated from the length of rib meat.

According to certain embodiments, the process for preparing a de-boned length of rib meat includes locating the length of rib meat in the moisture loss preventive environment and then cooking the length of rib meat for a first temperature from about 100 to about 300 degrees Fahrenheit for a period of time from about 1 to about 6 hours, and cooking the length of rib meat at a second temperature for a second period of time enable the removal of at least one of the rib bones from the length of rib meat, while maintaining a substantially intact continuous length of rib meat. Upon completion of the cooking stage of the process, at least one of the rib bones is separated from the length of rib meat.

According to certain embodiments, the process for preparing a de-boned length of rib meat includes locating the length of rib meat in the moisture loss preventive environment and then cooking the length of rib meat at a first temperature for a first period of time, and cooking said length of rib meat at a second temperature from about 200 to about 400 degrees Fahrenheit for a time period from about 30 about 120 minutes to enable the removal of at least one of the rib bones from the length of rib meat, while maintaining a substantially intact continuous length of rib meat. Upon completion of the cooking stage of the process, at least one of the rib bones is separated from the length of rib meat.

According to certain embodiments, the process for preparing a de-boned length of rib meat includes locating the length of rib meat in the moisture loss preventive environment and then cooking the length of rib meat at a first temperature from about 100 to about 300 degrees Fahrenheit for a time period from about 1 to about 6 hours, and cooking the length of rib meat for a second temperature from about 200 to about 400 degrees Fahrenheit for a time period from about 30 to about 120 minutes; and to enable the removal of at least one of the rib bones from the length of rib meat, while maintaining a substantially intact continuous length of rib meat. Upon completion of the cooking stage of the process, at least one of the rib bones is separated from the length of rib meat.

The various cooking regimens of the process may be carried out by cooking the length of rib meat in any suitable cooking apparatus. For example, and without limitation, cooking the length of rib meat may be carried out by cooking in a conventional oven, cooking in a convection oven, smoking, steaming, roasting, boiling, broiling, cooking in a slow cooker, halogen lamp cooking, or any combinations thereof. According a suitable embodiment, the cooking stages are carried out by smoking the length of rib meat. In other embodiments, a combination of smoking the length of rib meat and cooking by halogen lamps may be used to facilitate removal of the rib bones, yet maintaining the tenderness and juiciness of the rib meat to enable the separation of the rib bones from the rib meat.

The process for the preparation of the de-boned rib product also includes imparting a flavor to the length of rib meat. The step of imparting flavor to the length of rib meat may comprise at least one of seasoning the meat, marinating the meat, injection marinating the meat, dry rubbing the meat, basting the meat, smoking the meat, or combinations thereof.

Once the length of rib meat has been cooked to enable removal of the rib bones, the bones are removed. The rib bones may be removed from the rib meat by any suitable process known in the culinary art, so long as the desired length of rib meat remains substantially intact. For example, and not in limitation, the removal of at least one rib bones may be accomplished by manually removing the rib bones, using a non-automated hand-tool to remove the bones, by mechanically removing the rib bones with suitable power equipment, or by combinations thereof. It should be also noted that the rib bones may be removed prior to cooking the length of rib meat, so long as the process of removing the rib bones from the meat maintains a substantially intact length of rib meat.

If the cooked and de-boned length of rib meat is prepared in the retail restaurant setting, the product may be presented to the diner for consumption. If the cooked and de-boned length of rib meat is prepared and destined for resale at a retail grocery store, or other sales outlet, then the product can be suitably packaged. By way of illustration, suitable packaging includes vacuum packaging the length of cooked and de-boned rib meat. It is contemplated that the cooked and de-boned rib meat may also by suitable for sale as a frozen, heat and serve product that would be commercially available at a grocery outlet. In this case, the cooked and de-boned rib meat is frozen and packaged in a suitable package for resale.

Also disclosed is a packaged ready-to-heat and serve de-boned rib meat product. The packaged rib product comprises a package and at least one de-boned substantially intact length of rib meat that is contained within the package. According to certain embodiments, a separate flavoring agent may be associated with the packaged rib product. It should be noted that the separate flavoring agent may be contained with the cooked and de-boned rib meat inside of the package, or simply provided with the packaged rib meat product.

According to certain embodiments, also provided is a packaged ready-to-heat and serve rib meat product comprising a package, at least one cooked and de-boned substantially intact continuous length of rib meat contained within the package, and optionally a flavoring agent associated with the package. It should be noted that the separate flavoring agent may be contained with the cooked and de-boned rib meat inside of the package, or simply provided with the packaged rib meat product.

For the embodiments of the packaged rib meat product that includes a flavoring agent, the flavoring agent may include an agent in the form of dry rubs, sauces, bastes, marinades, injection flavorings, or combinations thereof.

Figure 4A:
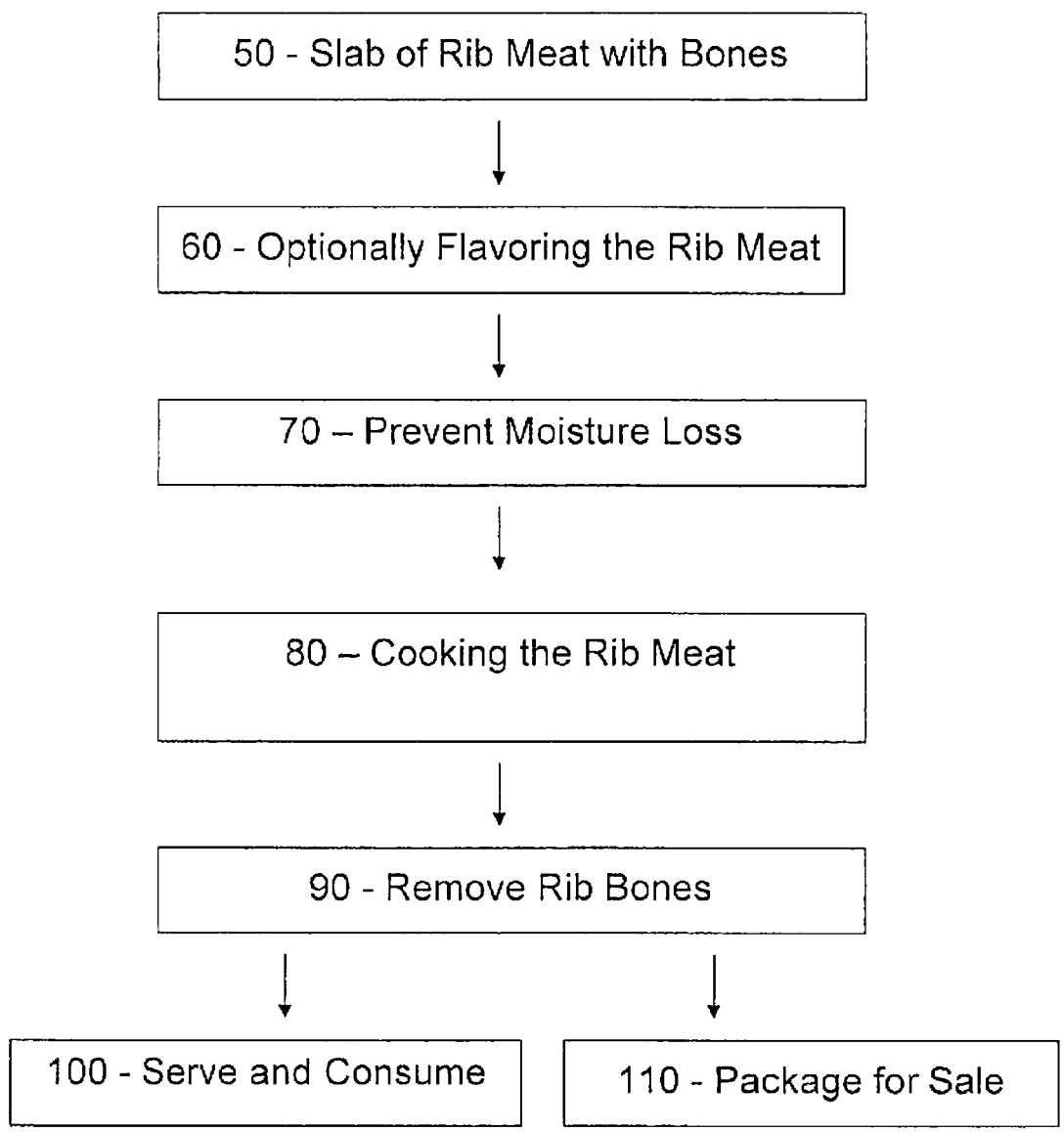
FIG. 4A is a flowchart of one illustrative embodiment of a process for preparing the cooked and de-boned rib meat product.

FIG. 4A depicts a flow chart for an illustrative embodiment of the process for preparing a cooked and de-boned length of rib meat. This process results in the preparation of de-boned length of rib meat that retains the natural consistency, texture and shape of a slab of rib meat had the bones not been removed from the rib meat.

At step 50, a slab of ribs is presented for processing. As described herein, the slab of ribs may comprise a slab of traditional spare ribs, a slab of St. Louis style ribs, baby back ribs, or any other rib cut. According to step 60, the process includes the optional step of imparting a flavoring to the rib meat with any combination of spices and seasonings. The exact form and blend of flavorings is unlimited and is up to the preparer of the slab of rib meat.

At step 70, the flavored or unflavored slab of rib meat is then located within a moisture loss preventive environment. Locating the slab of ribs in such an environment maintains a suitable moisture level within the slab of rib meat.

Following the optional flavoring 60 and locating 70 steps, if these steps are carried out, the length of rib meat is cooked 80 at a temperature and for a time sufficient to enable the removal of the rib hones from the length of rib meat, while maintaining a substantially intact length of rib meat. Following cooking step 80, the rib bones are separated from the slab of rib meat, leaving a substantially intact continuous length of rib meat.

After the bones have been removed from the rib meat in step 90, the boneless steak or filet of rib meat may be immediately consumed 100 or packaged for future sale 110. Alternatively, the boneless slab of rib meat can be further packaged as desired (e.g., frozen, seasoned, cooked, smoked etc.) to create a final servable food product. The further packaged boneless slab of rib meat can be sold as a pre-cooked ready to eat meal, and only requires that the slab of rib meat be warmed to a desirable temperature.

Figure 4B:
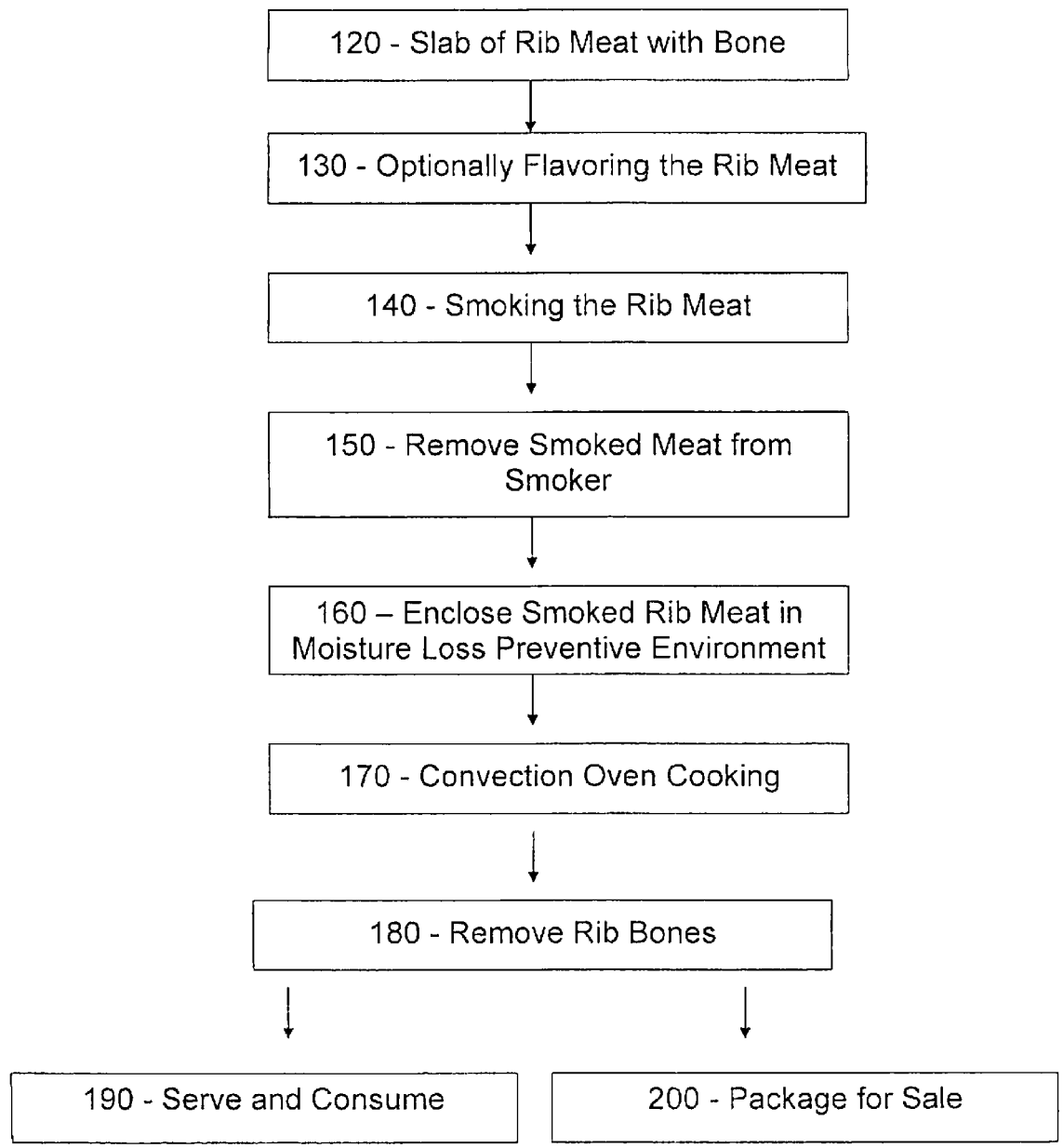
FIG. 4B is a flowchart of another illustrative embodiment of a process for preparing the cooked and de-boned rib meat product.

FIG. 4B depicts a flow chart for another illustrative embodiment of the process for preparing a cooked and de-boned length of rib meat. This process results in the preparation of de-boned length of rib meat that retains the natural consistency, texture and shape of a slab of rib meat had the bones not been removed from the rib meat.

At step 120, a slab of ribs is presented for processing. As described in connection with the flowchart of the illustrative embodiment shown in FIG. 4A, the slab of ribs may comprise a slab of traditional spare ribs, a slab of St. Louis style ribs, baby back ribs, or other rib cut. According to step 130, the process includes the optional step of imparting a flavoring to the rib meat with any combination of spices and seasonings. The exact blend of flavoring is unlimited and is up to the preparer of the slab of rib meat.

Following the seasoning stage, at step 140, the length of rib meat is exposed to a first cooking regimen which comprises exposing the length of rib meat to a flavored smoke at a temperature of at least 100 degrees Fahrenheit for a period of time between two hours and six hours. To "smoke" a slab of rib meat comprises burning flavored wood (for example, but not limited to Apple, Cherry, Hickory, Peach or Mesquite woods) within a confined area so that the slab of rib meat absorbs the aroma of the smoke and therefore imparts additional flavor to the slab of rib meat.

Following the "smoking" step 140, the slab of rib meat is then removed from the smoker 150 and optionally seasoned with various barbeque sauce flavors. The meat can be either basted with a semi-viscous fluid or "dry-rubbed" with a powder seasoning mix. In one embodiment, basting the rib meat is performed by covering the slab of rib meat with a fluid of high viscosity on the theory that the slab of rib meat will absorb additional flavor from the basting. Basting the meat allows the highly viscous fluid to penetrate the outer layer of the meat and permeate the lower layers of meat, providing additional flavor throughout the meat, and not only within the outermost layers of meat.

In another embodiment, the meat can also be seasoned with a "dry-rub". Dry rubs differ from basting sauces in that the rubs are powdery mixes lacking any form of moisture. Dry rub mixes can be made up of a multitude of seasonings into infinite number of mixes and only limited by the creativity of the preparer. The theory behind seasoning the slab of meat is the same behind the basting process. The powder seasoning mix will mix with the meats own juices secreted during cooking, allowing the mix to be absorbed into the lower layers of meat. However, in the seasoning process, both the basting step and dry rub step is purely optional and can be skipped at the desire of the preparer.

At step 160, the slab of rib meat is then enclosed within a moisture loss preventive environment. According to the embodiment of the process depicted in the flowchart of FIG. 4B, the length of rib meat is enclosed in a cooking bag, which is then sealed.

As shown at step 170, once the slab of rib meat is located within the moisture loss preventive environment, it is desirable that the slab of rib meat be cooked by convection oven cooking 170 for at least 60 minutes at a temperature of at least 200 degrees, depending on the individual oven and how many slabs are on each sheet tray. Thus, depending on the number of slabs on a tray, cooking time may be lengthened and/or the temperature be raised. Additionally, a single slab of rib meat may require less cooking time, and the temperature may need to be constant.

In another further embodiment, it is possible to wrap the slab of rib meat or seal in a hermetic enclosure prior to the smoking of the slab of rib meat or prior to the first period of time in the suitable cooking device. Therefore, it is optional that the slab of rib meat need not be wrapped or sealed in between the first and second cooking stages. Accordingly, if wrapped prior to the smoking stage, the slab of rib meat can be inserted directly into the second cooking stage for its desired length of time.

Following the second period of cooking at step 170, the slab of rib meat can be removed from the cooking enclosure. At this time, according to step 180, the slab of rib meat can be removed from the moisture loss preventive environment and the rib bones are separated from the length of rib meat to produce a substantially intact de-boned continuous length of rib meat.

Each rib hone within the slab of rib meat is exposed to very small forces in during the removal process, so that its fiber structure of the slab of rib meat is retained as much as possible, and the risk of damage to the meat is very low. What is left is a boneless slab of rib meat that is substantially intact.

The exact reason for the meat separating from the hone during the wrapped/cooking stage is not precisely known. Without being bound to any particular theory, locating the slab of rib meat within a moisture loss preventive environment protects the slab of rib meat within a cooking environment that maintains a high level of moisture level within the meat itself. This high level of moisture serves two purposes: first, retaining the moisture maintains the slab of rib meat's juiciness and tenderness, which prevents it from becoming dry and difficult to consume; second, the high level of moisture also acts as a solution to break down the natural attachments between the muscle (meat) and the bone. It is this breaking down of the bonds between the meat and bone that allows the bone to be removed from the slab of rib meat with little to no resistance and therefore leaves the slab of rib meat substantially intact.

After the bones have been removed in step 180, the boneless length of rib meat can then be immediately consumed 190 or packed either dry or with a marinade 200 for future sale. Alternatively, the boneless slab of rib meat can be further packaged as desired (e.g., frozen, seasoned, cooked, smoked etc.) to create a final servable food product. The further packaged boneless slab of rib meat can be sold as a pre-cooked ready to eat meal, and only requires that the slab of rib meat be warmed to a desirable temperature.

The disclosed process prepares a pork or beef meat cut to become a more attractive and economically beneficial product to achieve an end product that is more in demand. The boneless slab of rib meat can be consumed with utensils, in the manner similar to how one would consume other boneless or bone-in pork or beef meat products like steaks or pork chops.

Thus, provided is a process for producing, a boneless slab of rib meat that which results in a meaty and easy to consume boneless steak or filet of rib meat. This process involves a minimally invasive way to remove the rib hones from a slab of rib meat to provide a length of boneless rib meat. Accordingly, the process creates an edible boneless slab of rib meat, which can be consumed without having to maneuver around the rib bones themselves.

It will be understood that the embodiments described herein are merely illustrative and that a person skilled in the art may make many variations and modifications without departing from the spirit and scope of the invention. All such modifications and variations are intended to be included within the scope of the appended claims. It should be understood that the embodiments described herein are not only in the alternative, but can be combined.

We claim:

1. A process for preparing a length of de-boned rib meat comprising:
   cooking a length of rib meat having at least one rib bone at least partially embedded therein at a temperature and for a time sufficient to enable the removal of at least one of said rib bones from said length of rib meat, while maintaining a substantially intact length of rib meat; and
   removing at least one of said rib bones from said length of rib meat.

2. The process of claim 1, comprising:
   cooking said length of rib meat at a first temperature for a first period of time;
   locating said length of rib meat in a moisture loss preventive environment to facilitate retention of moisture within the length of rib meat;
   cooking said length of rib meat at a second temperature for a second period of time; and
   removing at least one of said rib bones from said length of rib meat.

3. The process of claim 2, comprising:
   cooking said length of rib meat for a first temperature from about 100 to about 300 degrees Fahrenheit for a period of time from about 1 to about 6 hours;
   locating said length of rib meat in a moisture loss preventive environment to facilitate retention of moisture within the length of rib meat;
   cooking said length of rib meat at a second temperature for a second period of time; and
   removing at least one of said rib bones from said length of rib meat.

4. The process of claim 2, comprising:
   cooking said length of rib meat at a first temperature for a first period of time;
   locating said length of rib meat in a moisture loss preventive environment to facilitate retention of moisture within the length of rib meat;
   cooking said length of rib meat at a second temperature from about 200 to about 400 degrees Fahrenheit for a time period from about 30 about 120 minutes; and
   removing at least one of said rib bones from said length of rib meat.

5. The process of claim 2, wherein:
   cooking said length of rib meat at a first temperature from about 100 to about 300 degrees Fahrenheit for a time period from about 1 to about 6 hours;
   locating said length of rib meat in a moisture loss preventive environment to facilitate retention of moisture within the length of rib meat;
   cooking said length of rib meat for a second temperature from about 200 to about 400 degrees Fahrenheit for a time period from about 30 to about 120 minutes;
   removing at least one of said rib bones from said length of rib meat.

6. The process of claim 2, wherein said locating said length of rib meat comprises hermetically sealing said length of rib meat.

7. The process of claim 6, wherein said locating comprises wrapping said length of rib meat with plastic wrap, metal foil, or enclosing within a cooking bag.

8. The process of claim 1, comprising:
   locating said length of rib meat in a moisture loss preventive environment to facilitate retention of moisture within the length of rib meat;
   cooking said length of rib meat at a temperature and for a time sufficient to enable the removal of at least one of said rib bones from said length of rib meat, while maintaining a substantially intact length of rib meat; and
   removing at least one of said rib bones from said length of rib meat.

9. The process of claim 8, wherein said locating said length of rib meat comprises hermetically sealing said length of rib meat.

10. The process of claim 9, wherein said locating comprises wrapping said length of rib meat with plastic wrap, metal foil, or enclosing within a cooking bag.

11. The process of claim 1, comprising:
    locating said length of rib meat in a moisture loss preventive environment to facilitate retention of moisture within the length of rib meat;
    cooking said length of rib meat at a first temperature for a first period of time;
    cooking said length of rib meat at a second temperature for a second period of time; and
    removing at least one of said rib bones from said length of rib meat.

12. The process of claim 11, comprising:
    locating said length of rib meat in a moisture loss preventive environment to facilitate retention of moisture within the length of rib meat;
    cooking said length of rib meat for a first temperature from about 100 to about 300 degrees Fahrenheit for a period of time from about 1 to about 6 hours;
    cooking said length of rib meat at a second temperature for a second period of time; and
    removing at least one of said rib bones from said length of rib meat.

13. The process of claim 11, comprising:
    locating said length of rib meat in a moisture loss preventive environment to facilitate retention of moisture within the length of rib meat;
    cooking said length of rib meat at a first temperature for a first period of time;
    cooking said length of rib meat at a second temperature from about 200 to about 400 degrees Fahrenheit for a time period from about 30 about 120 minutes; and
    removing at least one of said rib bones from said length of rib meat.

14. The process of claim 11, wherein:
    locating said length of rib meat in a moisture loss preventive environment to facilitate retention of moisture within the length of rib meat;
    cooking said length of rib meat at a first temperature from about 100 to about 300 degrees Fahrenheit for a time period from about 1 to about 6 hours;
    cooking said length of rib meat for a second temperature from about 200 to about 400 degrees Fahrenheit for a time period from about 30 to about 120 minutes; and
    removing at least one of said rib bones from said length of rib meat.

15. The process of claim 1, further comprising imparting a flavor to said length of rib meat.

16. The process of claim 15, wherein said imparting a flavor comprises said at least one of seasoning, marinating, injection marinating, dry rubbing, basting, or smoking.

17. The process of claim 1, wherein said cooking said length of rib meat comprises cooking in a conventional oven, cooking in a convection oven, smoking, steaming, roasting, boiling, broiling, cooking in a slow cooker, halogen lamp cooking, and combinations thereof.

18. The process of claim 17, comprising
    smoking said length of rib meat at a first temperature for a first period of time; and cooking said length of rib meat at a second temperature for a second period of time.

19. The process of claim 17, comprising
cooking said length of rib meat at a first temperature for a first period of time; and
halogen lamp cooking said length of rib meat at a second temperature and for a second period of time.

20. The process of claim 17, comprising
smoking said length of rib meat at a first temperature and for a first period of time; and
halogen lamp cooking said length of rib meat at a second temperature and for second period of time.

21. The process of claim 1, comprising removing said at least one rib bone manually, with a hand-tool, mechanically, or combinations thereof.

22. The process of claim 1, comprising packaging said cooked and de-boned length of rib meat.

23. The process of claim 1, comprising freezing and packaging said length of cooked and de-boned rib meat.

* * * * *